United States Patent Office 3,546,319
Patented Dec. 8, 1970

3,546,319
BLENDS OF POLYAMIDES, POLYESTER AND POLYOLEFINS CONTAINING MINOR AMOUNTS OF ELASTOMERS
Dusan C. Prevorsek, Morristown, and George E. R. Lamb, Mendham, N.J., assignors to Allied Chemical Corporation, New York, N.Y., a corporation of New York
No Drawing. Filed Sept. 10, 1968, Ser. No. 758,662
Int. Cl. C08g *39/10, 41/04*
U.S. Cl. 260—857
14 Claims

ABSTRACT OF THE DISCLOSURE

The specification discloses improved blends of at least two polymers of the group of polyesters, polyamides and polyolefins wherein the blend is modified by incorporating therein a minor amount of a suitable elastomer. These blends form films which show improved tear resistance and fibers which show superior resistance to splitting when compared to similar articles from conventional polymer blends in which the elastomer is omitted.

---

Polymer blends comprising combinations of at least two polymers of the group consisting of polyamides, polyesters and polyolefins present desirable properties which can be substantially enhanced by blending in minor amounts of certain elastomers. For example, the excellent high strength properties of polyamides have long made them attractive to a substantial portion of the synthetic fiber and yarn markets for textiles, carpet yarn, tire cord, bristles and the like. To illustrate, polylactams have certain disadvantages which have restricted their applicability for certain applications, e.g. nylon 6 has a lower tensile modulus than desired for resilient carpet yarn and for tire cord. The admixture of polylactams with other polymers to improve or modify certain properties is known and the resulting blends are attractive. For this purpose polyesters, such as polyethylene terephthalate, have been blended with these polyamides to form compositions which have a higher tensile modulus than unmodified polylactam. However, filaments or films made from such blends have been shown, under certain conditions of use, to display an undesirable tendency to split or fibrillate. This tendency may prove bothersome enough to outweigh those advantages the blends would otherwise have over the homopolymers. Properties of blends of polyolefins and polyesters and/or polylactams to which minor amounts of elastomer are added are also substantially enhanced.

It is an object of the present invention to provide blends of at least two of the groups of polylactam, polyester and polyolefins which can be formed into films, fibers and other shaped articles which have improved properties, e.g. increased resistance to tearing, abrasion and fibrillation.

Additional objects and advantages will become apparent from the following detailed description thereof.

We have discovered that blends of at least two of the group of a polyester, a polyamide and a polyolefin containing blended therein a minor amount of an elastomer produce compositions which are surprisingly better in some respects than the blends containing no elastomer. Fibers formed from these blends of the invention, for example, have a markedly improved resistance to fibrillation or splitting while films prepared from such compositions have relatively superior tear resistance.

According to the present invention, a blend of at least two of these polymers is prepared and a minor proportion of an elastomer is blended therein. The elastomeric component can be premixed with either of the components using e.g. a Banbury mixer, or it may be simply fed into the hopper of the extruder with the solid-pelletized or ground polymers. Since the elastomer must be finely dispersed in the final product it is important that the molten polymer mixture be exposed to efficient mixing action before entering the orifice of the die. The essential and unexpected feature of this invention is the fact that very small amounts of the rubbery component are substantial to achieve drastic improvements in transverse properties. For example with polyester-polyamide blends, elastomer in amounts varying from about 0.5% to about 15% and preferably from about 1% to about 10% by weight based on the polymer blend eliminates the tendency to split to the level usually encountered with one-phase polymeric systems.

The function of the elastomer in the oriented structure is not wholly understood. It is believed, however, that the observed improvement in the properties with blends which tend to crack in a direction perpendicular to the orientation can be attributed to at least two factors. First, the elastomeric particles reduce the modulus and increase the breaking elongation of a volume element surrounding the particle. This prevents the formation of cracks in this volume element when the specimen is strained. Furthermore, with suitable elastomers the elastomeric particles prevent the propagation of the existing cracks because the bond between the elastomeric phase and polyamide or polyester is stronger than the bond between the polyester and polyamide, for example.

The term elastomer is intended to include polymers whose glass transition temperatures are below normal ambient temperatures, preferably below zero degrees centigrade. The glass transition temperature will be understood to define the temperature at which the responses of polymer to stress or strain change from a hard and relatively brittle condition to one which is relatively soft and ductile (see e.g. P. Flory, Principles of Polymer Chemistry, Cornell University Press, Ithica, N.Y., 1953. p. 56). A polymer above its glass transition temperature exhibits typical elastomeric behavior characterized by a secant modulus not exceeding 3000 p.s.i. at 300% extension when measured at 20° C. Under favorable conditions, the elongation at break may reach or exceed one thousand percent.

A variety of elastomeric components can be used to achieve the desired effects. The criteria for their selection are summarized below.

The rubbery component must:

(1) be sufficiently stable at extrusion temperature to withstand processing without excessive degradation,
(2) have a sufficiently low viscosity at the drawing temperature to form an elongated phase in the drawn fiber,
(3) be sufficiently compatible with each of the polymer components to form a relatively strong bond with each of the polymer phases, e.g. a bond generally stronger than that between the polyester and polyamide phase,
(4) have a sufficiently low viscosity at the extrusion temperature to form a finely dispersed phase in the extrudate.

It is also desirable that the polymer, because of peculiarities of molecular structure, exhibit none or very little crystallinity after processing which normally involves melting and mixing of polymers in the extruder, extrusion, drawing and possibly an annealing step. The term elastomers in the present context excludes polymers which, though elastomeric, have a high degree of cross-linking and which are therefore unable to flow at high temperature. For the purposes of the present invention, the elastomer should have a melt viscosity of between $10^2$ and $10^4$ poise preferably between 500 and 2000 poise at a shear rate of 150 reciprocal seconds at the extrusion temperature.

It is further more necessary that the elastomer be chemically stable at the extrusion temperature. Degradation interferes with proper fiber extrusion either by causing the phenomenon of "dripping" when the molecular weight of the elastomer is reduced to excessively low values, or by causing a phenomenon similar to melt fracture when the elastomer cross-links and becomes unable to flow.

It is further, very important that the elastomer can be dispersed in the fiber matrix without forming particles exceeding 5 microns in diameter. If large particles of the elastomer are present the fiber strength can be greatly affected. At the same time the elastomer should by sufficiently incompatible with the other components of the blend to form at all times its own distinct phase in the blend.

In addition, it is important that the interfacial strength between the dispersed rubbery polymer and the components of the blend be greater than the interfacial strength between the major fiber forming components of the blend; only under these conditions can the particles prevent the propagation of the cracks through the interface which in essence is the mechanism by which the transverse properties are improved by the incorporation of the above-described elastomers.

Any of several available elastomers whose characteristics comply with the foregoing, such as copolymers or block copolymers of butadiene and styrene, or of butadiene and acrylonitrile or of ethylene and propylene and the like, or mixtures thereof may be suitably employed.

Illustrative of suitable fiber-forming polyamides and polyesters which may be blended with minor quantities of an elastomer in the present invention are those described in U.S. Pats. 2,071,250; 2,130,523; 2,130,948 and 2,190,770.

Among the polyamides which may be used are included various polymerized lactams. Lactams suitable for use in the invention comprise lactams having from 7 to 12 atoms in the ring and include ε-caprolactam, caprylactam, oenantholactam and laurolactam. Mixtures of lactams can also be employed. Included among the preferred compounds are polyhexamethylene adipamide, polyhexamethylene sebacamide, poly(epsilon caproamide) or ε-caprolactam. The lactams may be polymerized hydrolytically by well known methods, as by heating to a suitable temperature, which for ε-caprolactam is generally from about 225° C. to about 280° C. and preferably from about 240° C. to about 260° C., under an inert atmosphere in the presence of a catalyst. Suitable catalysts are well known and include steam, water, ε-aminocaproic acid and the like. The polymerization is continued until the desired molecular weight is obtained. This can be determined by measuring reduced viscosity which can vary from about 0.5 to about 4.0. Molecular weights corresponding to reduced viscosities on the order of at least 1.0 are generally required for the fabrication of fibers. An additional requirement for the fabrication of fibers is a melt viscosity on the order of from 10 to 70 grams of polymer extruded in 10 minutes at 260° C. with an applied weight of 2,160 grams, as measured according to ASTM Test D–1238–62T, for optimum extrudability and fiber properties.

The polyesters useful in the blends of the invention are prepared by condensing a dicarboxylic acid or the lower alkyl ester, acid halide, or anhydride derivatives thereof with a glycol, according to methods well-known in the art.

Among the aromatic and aliphatic dicarboxylic acids suitable for preparing polyesters useful in the present invention are oxalic acid, malonic acid, succinic acid, glutaric acid, adipic acid, suberic acid, azelaic acid, sebacic acid, terephthalic acid, isophthalic acid, p-carboxyphenoxyacetic acid, p,p' - dicarboxydiphenyl, p,p' - dicarboxydiphenylsulfone, p - carboxyphenoxyacetic acid, p - carboxyphenoxypropionic acid, p - carboxyphenoxybutyric acid, p - carboxyphenoxyvaleric acid, p - carboxyphenoxyhexanoic acid, p,p'-dicarboxydiphenylmethane, p,p - dicarboxydiphenylpropane, p,p' - dicarboxydiphenyloctane, 3 - alkyl - 4 - (β-carboxyethoxy) - benzoic acid, 2,6-naphthalene dicarboxylic acid, 2,7-naphthalene dicarboxylic acid, and the like. Mixtures of dicarboxylic acids can also be employed. Terephthalic acid is particularly preferred.

The glycols suitable for preparing the polyesters useful in the present invention include straight chain alkylene glycols of 2 to 12 carbon atoms such as ethylene glycol, 1,3 - propylene glycol, 1,6 - hexylene glycol, 1,10 - decamethylene glycol, 1,12-dodecamethylene glycol and the like. Aromatic glycols can be substituted in whole or in part. Suitable aromatic dihydroxy compounds include p-xylylene glycol, pyrocatechol, resorcinol, hydroquinone, or alkyl-substituted derivatives of these compounds.

Included among the preferred polyesters are polyethylene terephthalate and polyesters having recurring units derived from glycols having more than two carbon atoms in the chain, e.g. butylene glycol, decamethylene glycol and trans-bis-1,4-(hydroxymethyl)cyclohexane.

The term polyolefin in this invention contemplates various homopolymers and copolymers including the crystalline form, e.g. polyolefin homopolymers such as polypropylene, polyethylene, poly 4-α-methyl pentene and copolymers thereof.

The blends of the invention may comprise a mixture containing from about 20% to about 80% by weight of polyester based on a modified polyamide or polyolefin matrix. Preferably the blends will contain from about 30% to about 70% by weight of polyester to obtain optimum improvement in the properties of the modified polyolefin and/or polyamide.

The blends can be prepared by admixing the desired proportion of the polymers as described above at a temperature from the melting point of the higher melting component up to about 350° C. Any two or more of the polyolefin/polyamide and the polyester can be blended dry before melting or the entire mixing step can be carried out conveniently by stirring or extrusion in the melt. Blending is preferably carried out in a dry, inert atmosphere, since it desirable to have a low moisture content in the blend and to prevent degradation reactions of the polylactam.

Alternatively the blends can be prepared in solution by dissolving the polylactam and the polyester in a common solvent and precipitating a mixture of the polymers either by evaporating the solvent or by adding a non-solvent to the solution.

The blends of this invention may be modified by the addition of various additional known polymers. Amounts of from 1 to about 80% based on the weight of the blend, preferably not exceeding 60%, may be employed for example.

The blends can be formed into films, molded articles or monofilaments and drawn into fibers by the well-known techniques used for polylactams. Typically the blends are melted, mixed and formed in a single step process in an extruder.

The invention will be further illustrated by the following examples, but it is to be understood that the invention is not meant to be limited to the details disclosed therein. In the examples all parts are by weight unless otherwise noted.

EXAMPLE I (A) Sixty parts of polycaprolactam having a number average molecular weight of 27,000, 40 parts of polyethylene terephthalate having a reduced viscosity of 0.5 deciliter/gram and 2 parts of a styrene-butadiene elastomeric copolymer were blended in an extruder at 540° F. and extruded as a monofilament through a die maintained at 560° F. at a rate of 12.5 cc./min. The extrudate was quenched in a cold water bath and stretched at a draw ratio of 3:1 by passing around a draw pin at 85° C. and thereafter over a heating plate at 150° C.

The stretched monofilament was slightly crushed by passing through two rollers situated 0.003″ apart and vibrated by passing through a high velocity jet stream of air as described in U.S. patent application Ser. No. 680,678, filed Nov. 6, 1967, entitled Bulking of Yarn, Prevorsek et al.

The monofil split at several points along its length into several fibrils.

(B) The above experiment was repeated using 4 parts of the styrene-butadiene copolymer. After stretching, crushing and vibrating the monofil as in A, the resulting monofil retained its integrity over its whole length.

(C) A third monofil was now prepared in similar manner except that no styrene-butadiene copolymer was added to the blend. The stretched, crushed and vibrated fiber split into a multitude of fibers giving an appearance similar to that of a staple type yarn.

EXAMPLE II

Seventy parts of polycaprolactam as in Example I, 30 parts of polyethylene terephthalate having a reduced viscosity of 0.27 and 5 parts of styrene-butadiene copolymer as in Example I were blended and extruded as a monofilament as in Example I except that the extruder temperature was 510° F. and the die temperature was 520° F. The monofilament was stretched at 160° C. to a draw ratio of 2:1, crushed and vibrated as in Example I.

The fiber exhibited no evidence of splitting when viewed under a microscope.

A fiber prepared as above but omitting the styrene-butadiene copolymer when stretched, crushed and vibrated split into a large number of fibrils.

EXAMPLE III (A) a dry blend of 65 parts of polypropylene with a viscosity average molecular weight (Mv.) of approximately 300,000, 35 parts of nylon 6 with a number average molecular weight of approximately 18,000 and 4 parts of a block copolymer of styrene and butadiene was extruded as a monofilament of 0.020 inch diameter, using a screw type extruder. The barrel temperature was 470° F., the die temperature 485° F. The monofilament was then stretched to four times its original length over a heating block kept at 150° C. The drawn filament was then passed between two rollers and flattened to approximately 2.5 mils. Subsequently, the crushed filament was passed through a device where an air jet subjected the filament to a violent vibrating action. The filament, after this treatment showed no sign of splitting.

(B) A similar filament as described in (A), but without the butadiene-styrene copolymer was prepared and treated in identical fashion. In this case the crushed monofil split under the action of the air jet into numerous fibers and the final product had the appearance of a bulky textile yarn.

EXAMPLE IV

A dry blend of 62 parts of poly(ethylene terephthalate) with a reduced viscosity in metacresol of 0.65 decilit./g., 38 parts of polypropylene with a viscosity average molecular weight (Mv.) of approximately 300,000 and 4 parts of a block copolymer of styrene and butadiene was extruded as a monofilament. After further treatment as in the previous example it was found that this filament would not be split by the air jet, whereas a similar filament containing no styrene-butadiene copolymer readily split into a number of fibrils. In both cases, the rolling and splitting step was carried out as described in previous examples.

EXAMPLE V

Forty parts of polycaprolactam having a number average molecular weight of 22,000, 40 parts of polypropylene having a melt index of 7.5 grams per 10 minutes, 20 parts of polyethylene terephthalate having a reduced viscosity of 0.24 and 10 parts of styrene-butadiene copolymer as in Example I were blended in an extruder at 500° F. and extruded through a die at 520° F. in the form of a monofilament 0.015 inch in diameter. The monofilament was quenched in cold water and stretched over a heating block at 50° C. to a draw ratio of 3:1.

The stretched fiber was crushed and vibrated as in Example I. The fiber evidenced no tendency to split or crack.

Additional lengths of fiber were stretched at various higher temperatures up to 175° C. The same behavior was observed.

Fibers prepared in similar manner but omitting the styrene-butadiene copolymer split into numerous fibrils, independent of the draw temperatures employed which varied from 50° C. to 175° C.

It will be apparent that numerous modifications and variations may be effected without departing from the novel concepts of the present invention, and the illustrative details disclosed are not to be construed as imposing undue limitations on the invention.

We claim:

1. A composition comprising a blend of at least two polymers selected from the group consisting of fiber forming polyamides, polyesters prepared by condensing (A) a member selected from the group consisting of (1) an aromatic or aliphatic dicarboxylic acid (2), a lower alkyl ester of an aromatic or aliphatic dicarboxylic acid (3) an aromatic or aliphatic dicarboxylic acid halide (4) an aromatic or aliphatic dicarboxylic acid anhydride and (5) a mixture of any of (1) to (4) with (B) a member selected from the group consisting of (1) $C_2$–$C_{12}$ alkylene glycols (2) aromatic diols and (3) alkyl aromatic diols and poly alpha olefin homoplymers or copolymers wherein any of said polymers is present in amounts not exceeding 80% by weight and containing from 0.5 to 15% based on the polymer blend of an elastomer characterized by (a) a glass transition temperature between minus 100° and 0° C. and (b) a secant modulus at 300 percent extension of between 100 and 3000 p.s.i. when measured at 20° C. said elastomers being selected from the group consisting of a copolymer of butadiene with styrene, butadiene with acrylonitrile, an ethylene propylene copolymer, and mixtures thereof.

2. A fiber formed from the composition of claim 1.

3. A film formed from the composition of claim 1.

4. A composition according to claim 1 wherein said lactam is ε-caprolactam.

5. A composition according to claim 1 wherein said polyester is polyethylene terephthalate.

6. A compositoin according to claim 1 wherein said elastomer is a block copolymer of butadiene-styrene.

7. A polyamide containing composition according to claim 6 wherein said polyolefin comprises polypropylene.

8. A composition according to claim 1 wherein said elastomer is a random or block co-polymer or a combination of block and random co-polymer of ethylene and propylene.

9. A composition according to claim 1 wherein said elastomer is a random or block or combination of block and random co-polymer of butadiene and acrylonitrile.

10. A process for preparing fibers from blends of at least two polymers selected from the group consisting of fiber forming polyamides, polyesters prepared by condensing (A) a member selected from the group consisting of (1) an aromatic or aliphatic dicarboxylic acid (2) a lower alkyl ester of an aromatic or aliphatic dicarboxylic acid (3) an aromatic or aliphatic dicarboxylic acid halide (4) an aromatic or aliphatic dicarboxylic acid anhydride and (5) a mixture of any of (1) to (4) with (B) a member selected from the group consisting of (1) $C_2$–$C_{12}$ alkylene glycols (2) aromatic diols and (3) alkyl aromatic diols and prepared by condensing poly alpha olefin homopolymers or copolymers which comprises blending not in excess of 80% by weight of one of said polymers with at least one other of said polymers, and from about 0.5 to about 15% based on the polymer blend by weight of an elastomer, characterized by (a) a glass transition temperature between minus 100° and 0° C. and (b) a secant modulus at 300 percent extension of between 100 and 3000 p.s.i. when measured at 20° C., said elastomers being selected from the group consisting of a copolymer of butadiene with styrene, a copolymer of butadiene with acrylonitrile, and ethylene propylene copolymer, and mixture thereof, heating the blend to a temperature above the melting point of the highest melting component and forming a fiber therefrom.

11. A process according to claim 10 comprising a blend of polyamide and polyester wherein said polyamide is ε-caprolactam and said polyester is polyethylene terephthalate.

12. A process according to claim 10 wherein the elastomer is a butadiene-styrene block copolymer.

13. A process according to claim 9 wherein the elastomer is a random or block or combination of random and block copolymer of ethylene and propylene.

14. A process according to claim 10 wherein the elastomer is a random or block or combination or random and block copolymer of butadiene and acrylonitrile.

References Cited
UNITED STATES PATENTS

| | | | |
|---|---|---|---|
| 3,235,625 | 2/1966 | Ballini | 260—873 |
| 3,369,057 | 2/1968 | Twilley | 260—857 |
| 3,382,305 | 5/1968 | Breen | 260—857 |
| 3,433,855 | 5/1969 | Hagemeyer | 260—873 |

PAUL LIEBERMAN, Primary Examiner

U.S. Cl. X.R.

260—75, 78, 873